US009321238B2

(12) United States Patent
Bird et al.

(10) Patent No.: US 9,321,238 B2
(45) Date of Patent: Apr. 26, 2016

(54) NON-CERAMIC STRUCTURAL PANEL WITH BALLISTIC PROTECTION

(75) Inventors: Connie E. Bird, Rocky Hill, CT (US); Alan R. Goodworth, Oxford, CT (US); Thomas A. Carstensen, Shelton, CT (US); Gary Hamilton, Middletown, CT (US)

(73) Assignee: Sikorsky Aircraft Corporation, Stratford, CT (US)

( * ) Notice: Subject to any disclaimer, the term of this patent is extended or adjusted under 35 U.S.C. 154(b) by 604 days.

(21) Appl. No.: 13/224,677

(22) Filed: Sep. 2, 2011

(65) Prior Publication Data

US 2013/0055881 A1 Mar. 7, 2013

(51) Int. Cl.
| | |
|---|---|
| *B32B 3/06* | (2006.01) |
| *B32B 5/26* | (2006.01) |
| *B32B 7/08* | (2006.01) |
| *B32B 15/14* | (2006.01) |
| *B32B 15/20* | (2006.01) |
| *B32B 3/08* | (2006.01) |

(52) U.S. Cl.
CPC ... *B32B 3/06* (2013.01); *B32B 3/08* (2013.01); *B32B 5/26* (2013.01); *B32B 7/08* (2013.01); *B32B 15/14* (2013.01); *B32B 15/20* (2013.01); *B32B 2260/046* (2013.01); *B32B 2262/0253* (2013.01); *B32B 2571/02* (2013.01); *B32B 2605/18* (2013.01); *Y10T 29/49826* (2015.01); *Y10T 428/24008* (2015.01); *Y10T 428/249924* (2015.04)

(58) Field of Classification Search
CPC .................................. B64D 7/00; B32B 7/08
USPC ............ 89/36.11, 36.01, 939, 36.02; 428/86, 428/223; 244/121
See application file for complete search history.

(56) References Cited

U.S. PATENT DOCUMENTS

| | | | | |
|---|---|---|---|---|
| 4,732,803 | A * | 3/1988 | Smith, Jr. ...................... | 428/212 |
| 5,102,723 | A * | 4/1992 | Pepin ............................ | 428/223 |
| 5,343,796 | A * | 9/1994 | Cordova et al. .............. | 89/36.02 |
| 5,824,411 | A * | 10/1998 | Shalaby et al. ............... | 428/364 |
| 5,935,680 | A * | 8/1999 | Childress ...................... | 428/119 |
| 6,138,275 | A * | 10/2000 | Sacks ................................ | 2/2.5 |
| 6,139,942 | A * | 10/2000 | Hartness et al. ........... | 428/298.1 |
| 6,172,163 | B1 * | 1/2001 | Rein et al. ..................... | 525/240 |
| 6,612,217 | B1 | 9/2003 | Shockey | |
| 7,200,912 | B2 * | 4/2007 | Bouillon et al. ................ | 29/432 |
| 7,721,495 | B2 * | 5/2010 | Kismarton ................. | 52/309.16 |
| 7,748,119 | B2 * | 7/2010 | Kismarton .................... | 29/897.2 |
| 8,186,262 | B2 * | 5/2012 | Farquhar et al. ............. | 89/36.01 |
| 8,272,188 | B2 * | 9/2012 | Johnson et al. ............... | 52/782.1 |
| 8,869,673 | B2 * | 10/2014 | Townsend ................ | B64C 1/20 89/36.01 |
| 2003/0114064 | A1 | 6/2003 | Fu et al. | |
| 2011/0005328 | A1 | 1/2011 | Hayford et al. | |

FOREIGN PATENT DOCUMENTS

| | | |
|---|---|---|
| DE | 2009014973 | 9/2010 |
| WO | 0056541 | 9/2000 |

OTHER PUBLICATIONS

European Search Report for European Application No. 12182538.4-2124.

* cited by examiner

*Primary Examiner* — Reginald Tillman, Jr.
(74) *Attorney, Agent, or Firm* — Carlson, Gaskey & Olds, P.C.

(57) ABSTRACT

An armor panel includes a multiple of pins which penetrate a first skin, a high molecular weight polyethylene fiber composite material layer and a second skin which integrates ballistic protection into load bearing structure.

20 Claims, 7 Drawing Sheets

NON-CERAMIC STRUCTURAL PANEL WITH BALLISTIC PROTECTION

STATEMENT REGARDING FEDERALLY SPONSORED RESEARCH OR DEVELOPMENT

This invention was made with government support with the United States Army under Contract No.: W911W6-06-2-0001. The government therefore has certain rights in this invention.

BACKGROUND

The present application relates to armor, and more particularly to a lightweight armor panel system which integrates ballistic protection into load bearing structure.

Composite panels may incorporate honeycomb (HC) cores for the fabrication of aerospace structures due to their advantageous strength to weight ratio. Honeycomb core composite articles include upper and lower composite skins, i.e., fiber reinforced resin matrix laminates that are separated and stabilized by the HC core. Advanced sandwich core materials may replace or complement conventional HC cores to separate and stabilize composite skins.

The high strength and low weight of such sandwich construction results in lower overall aircraft system weight. Although high in strength and low in weight, composite panels provide little ballistic protection.

Conventional armor systems for aircraft are often a type of appliqué armor in which parasitic armor, such as steel or ceramic plates are placed over existing aircraft structure in critical areas so as to defeat small arms fire. Although effective, these parasitic solutions may result in added weight which may reduce mission capabilities.

SUMMARY

An armor panel according to an exemplary aspect of the present disclosure includes a multiple of pins which penetrate a first skin, a high molecular weight polyethylene fiber composite material layer and a second skin.

An aircraft according to an exemplary aspect of the present disclosure includes a structural panel mounted to an airframe, the structural panel includes a high molecular weight polyethylene fiber composite material layer.

A method of armoring an aircraft according to an exemplary aspect of the present disclosure includes mounting a structural panel to an airframe, the structural panel includes a high molecular weight polyethylene fiber composite material layer.

BRIEF DESCRIPTION OF THE DRAWINGS

Various features will become apparent to those skilled in the art from the following detailed description of the disclosed non-limiting embodiment. The drawings that accompany the detailed description can be briefly described as follows.

DETAILED DESCRIPTION

Figure 1:
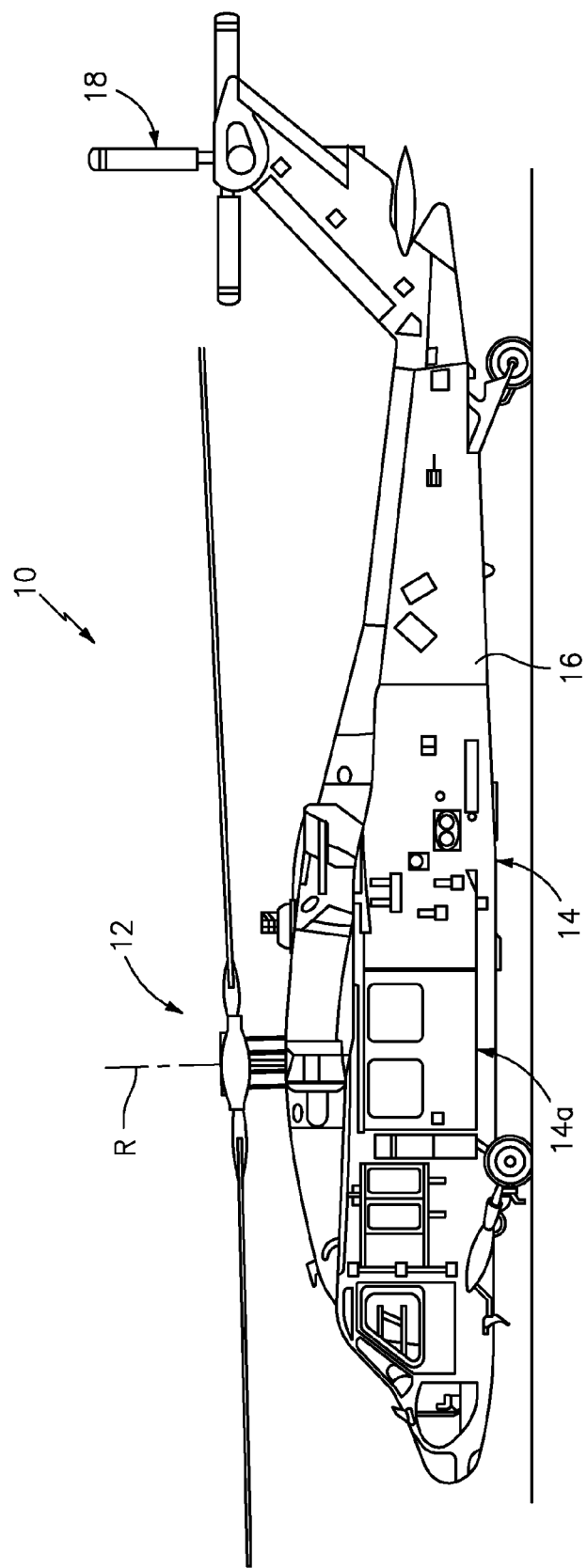
FIG. 1 is a general side perspective view of an exemplary rotary wing aircraft embodiment for use with the present invention.

FIG. 1 schematically illustrates a rotary-wing aircraft 10 having a main rotor system 12. The aircraft 10 includes an airframe 14 having an extending tail 16 which mounts a tail rotor system 18, such as an anti-torque system. The airframe 14 includes an armored airframe section 14A. Although a particular helicopter configuration is illustrated and described in the disclosed embodiment, other configurations and/or machines, such as high speed compound rotary wing aircraft with supplemental translational thrust systems, dual contra-rotating, coaxial rotor system aircraft, turbo-props, tilt-rotors and tilt-wing aircraft, will also benefit from the present invention.

Figure 2:
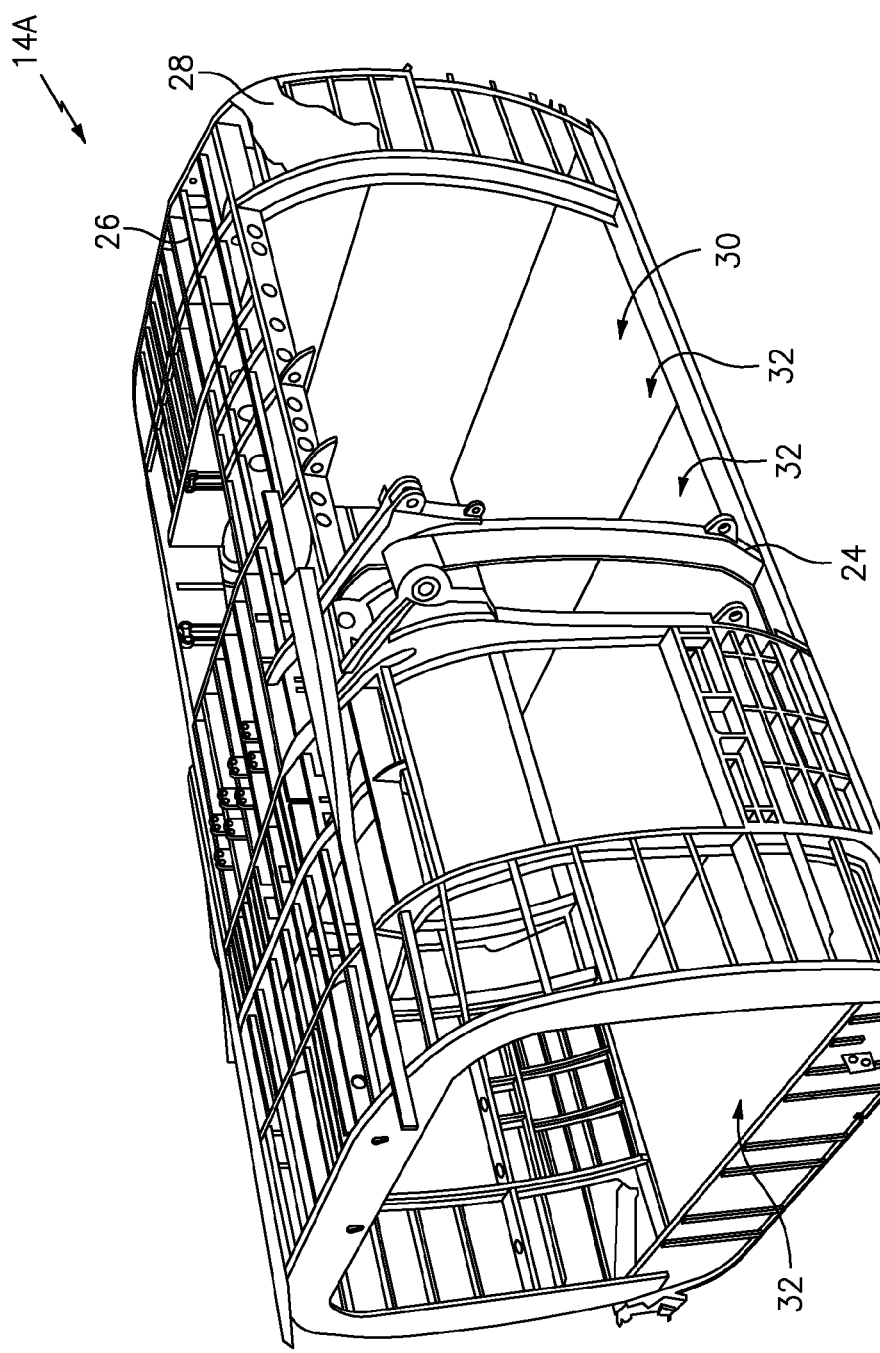
FIG. 2 is a perspective side view of an airframe section of the rotary wing aircraft of FIG. 1 illustrating an armored floor system and an armored skin section.
Figure 3:
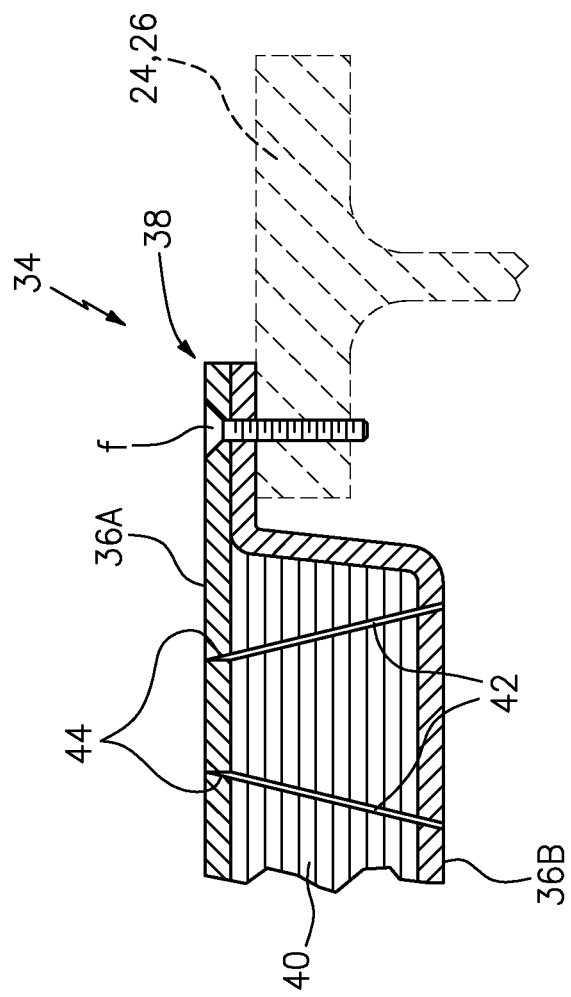
FIG. 3 is a sectional view of an armor panel.

With reference to FIG. 2, the airframe section 14A, here illustrated as a cabin section, which may include, inter alia, a multitude of frame members 24 and a multitude of beam members 26 which mount a structural armor system 28. The frame members 24 and beam members 26 are illustrated as arranged in a generally rectilinear pattern, however, any arrangement may be provided. The structural armor system 28 includes in the disclosed non-limiting embodiment, an aircraft outer skin 30 and a floor system 32 formed of a multiple of armored panels 34 (FIG. 3).

The structural armor system 28 or 34 as defined herein provides an integrated solution wherein the armor protection is integrated into load bearing structure to provide ballistic protection and a more optimized lightweight solution to maximize mission capability. It should be understood that armor panels 34 for a rotary-wing aircraft are described only for illustrative purposes in the disclosed embodiment and that various armored panels including appliqué armor, wall panels, seat panels, housing structures and the like will also benefit from the present invention. With the integration of armor into the load bearing structure itself, ballistic protection of the occupants and crew is provided while the total weight of the integrated armor-structure system is reduced as compared to parasitic armor systems. The weight reduction over current parasitic armor systems effectively increases the payload and range of the intended mission. It should be understood that other components, which are to be armored for other reasons, such as a gas turbine engine fan blade containment system will also benefit herefrom With reference to FIG. 3, each individual armor panel 34 generally includes skins 36A, 36B, a carrier 40 and a multiple of pins 42. The pins 42 may penetrate the skins 36A, 36B to form a bond/mechanical lock with the skins 36A, 36B. It should be appreciated that although a generally planar panel is illustrated, various shapes will benefit herefrom to include but not be limited to curved aircraft skin panels, flat floor panels, and other components.

The skins 36A, 36B may be manufactured of a structural material such as S2 glass composite fibers in API SC-15 toughened epoxy resin, carbon, Kevlar ceramic fibers, or other fibers. Alternatively, the skins 36A, 36B may be of a metallic alloy material such as sheets of titanium, steel or aluminum. It should be understood that each skin 36A, 36B may be manufactured of a different or equivalent material.

The skins 36A, 36B may be formed to surround the carrier 40 and define, for example, a flange edge structure 38 which facilitates mechanical attachment to the airframe 14, 24, or 26 through fasteners which are located through the flange edge structure 38. Alternatively, the flange edge structure 38 may be formed by additional layers which surround or otherwise attach to the skins 36A, 36B. It should be understood that other or no flange edge structures need be formed by the armor panel 34.

The carrier 40 may be manufactured of a high molecular weight polyethylene fiber composite material layer such as Dyneema™ that has ballistic capability but little structural strength. Alternate high molecular weight polyethylene fiber composite materials include Spectra®, which provides polyethylene fibers that offer significant strength combined with minimum weight. The high molecular weight polyethylene fiber composite material operates, for example, as a spall shield that traps projectile and fragments.

The pins 42 extend through the carrier 40 and penetrate the skins 36A, 36B to form a truss-like structure. Such sandwich panel-like construction operates by the separation and stabilization of the relatively thin skins 36A, 36B with the pins 42. This forms a section with a large moment of inertia (parallel axis theorem) to resist bending loads such that the carrier 40 stabilizes the pins 42 to resist buckling. That is, the carrier 40 stabilizes the pins 42 even through the carrier 40 provides minimal inherent structural strength. Alternatively, the pins 42 could be bonded to the skin 36A, 36B. In operation together, the system provides a rigid structural panel with inherent ballistic tolerance in a relatively light weight panel.

The pins 42 may be manufactured of a non-metallic material or a metal alloy. The pins 42 are elongated members which may include sharpened ends 44 which facilitates piercing of the carrier 40 and the skins 36A, 36B. It should also be appreciated that although a particular shape of pins with particular shaped ends are disclosed in the illustrated embodiment, other pins will benefit herefrom. It should also be appreciated that the pattern of the pins and the number thereof may be tailored to accommodate various strength and stiffness requirements. The truss-like or other structure of the pins 42 may provide further ballistic resistance and operate essentially as a slat armor to deflect or otherwise break-up projectiles.

Figure 4:
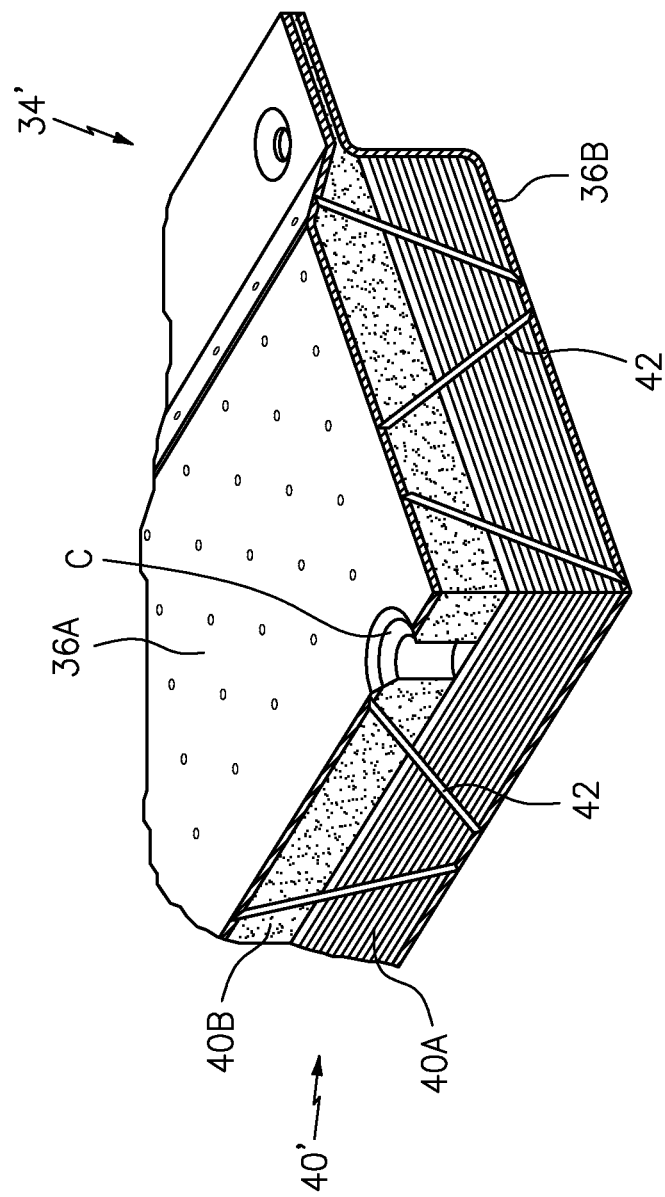
FIG. 4 is a sectional view of another armor panel.

With reference to FIG. 4, another armor panel 34' may include a carrier 40' with a layer of a high molecular weight polyethylene fiber composite material 40A and a layer of a lightweight non-ballistic tolerant material 40B such as a foam material. The lightweight non-ballistic tolerant material 40B facilitates a lightweight increase in panel depth to provide, for example an aircraft floor panel to facilitate installation of seat floor pans, cargo tie-down pans and other preformed components C typical of aircraft floors for recess mounting within the armored panel 34' without loss of armored protection in that area.

Figure 5:
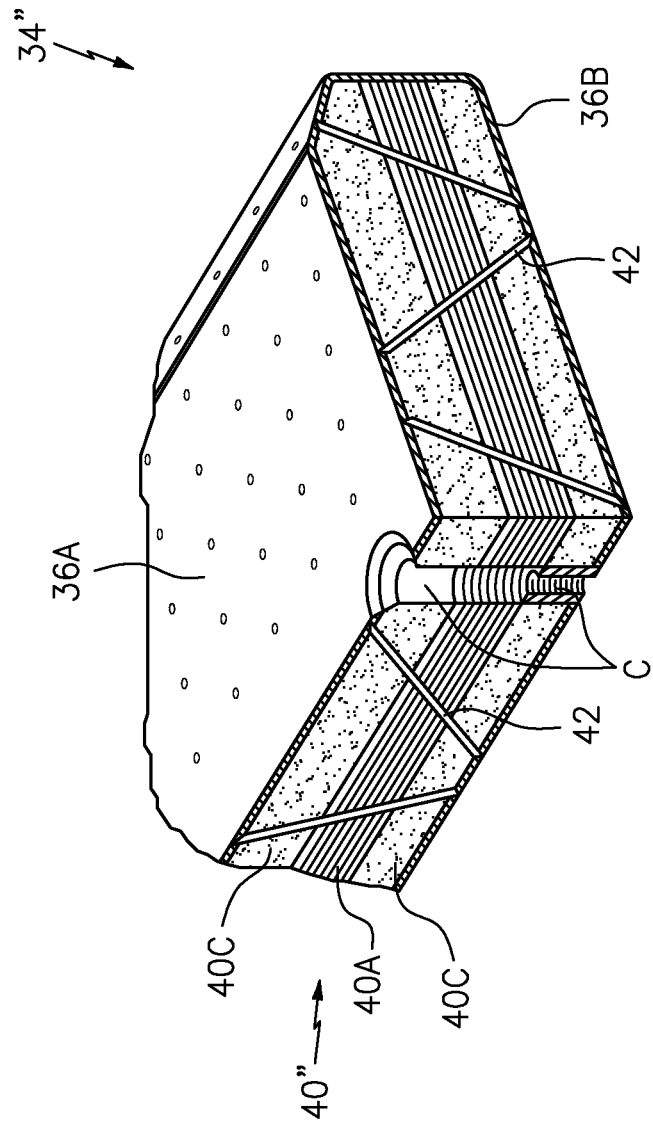
FIG. 5 is a sectional view of yet another armor panel.

With reference to FIG. 5, another armor panel 34''' includes a carrier 40'' within which alternate layers of a high molecular weight polyethylene fiber composite material 40A and other lightweight non-ballistic tolerant layers 40C.

In one non-limiting embodiment, a method of assembly inserts the pins 42 into the high molecular weight polyethylene fiber composite material when the material is unconsolidated as pre-preg ply layers to facilitate receipt of the pins 42 which are inserted to extend above the surfaces thereof. The pre-preg plys may then consolidated under heat and pressure to form a non-structural assembly. The consolidated carrier 40 with formed in pins 42 is then skinned with the skins 36A, 36B to interlock the skins 36A, 36B with the pins 42 to provide a bond/mechanical lock therebetween and form the final structural panel.

In another non-limiting embodiment, a method of assembly presses the pins 42 through an assembly of unconsolidated pre-preg ply layers of the carrier 40 and skins 36A, 36B. The entire assembly is then consolidated under heat and pressure to form the final structural panel.

Figure 6:
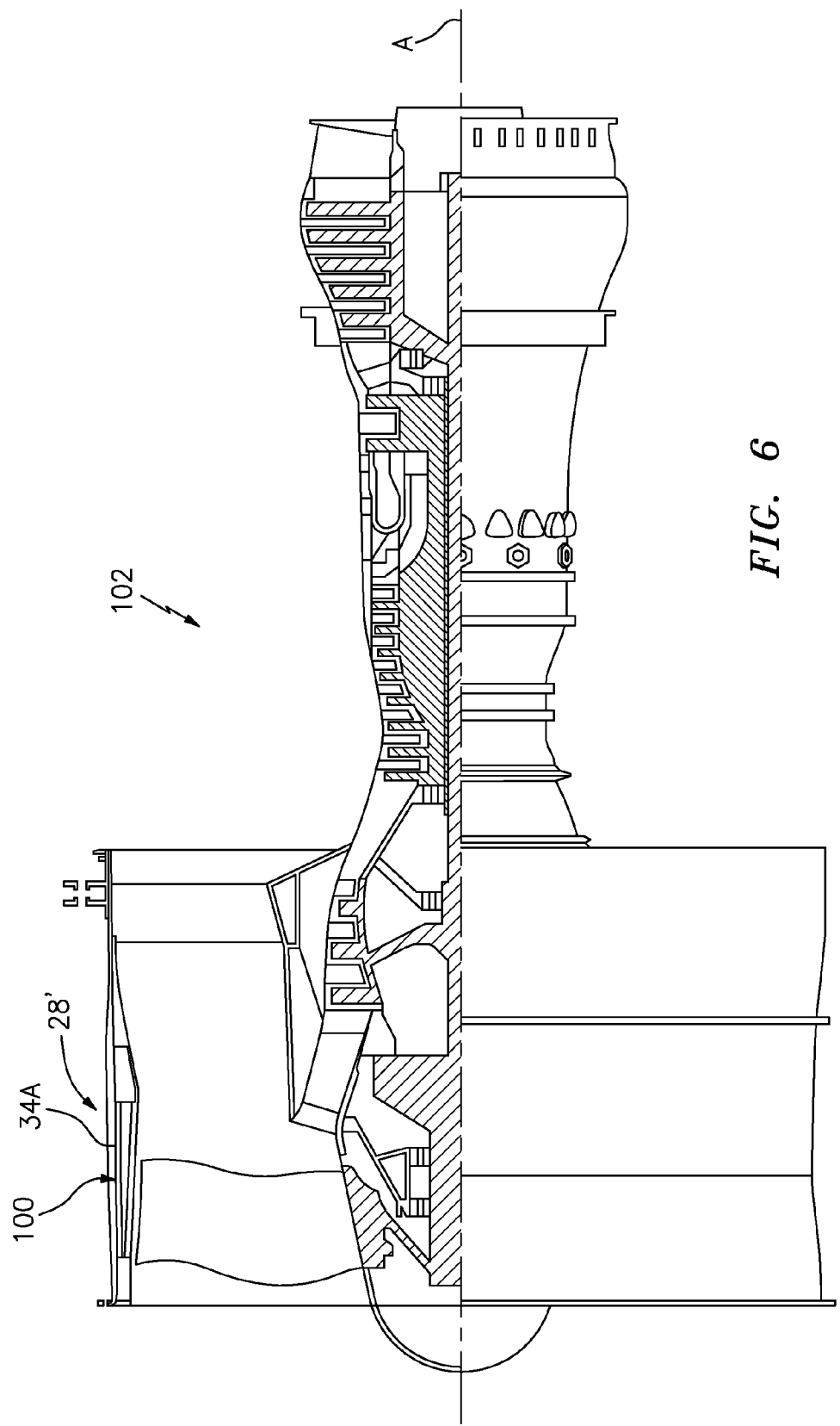
FIG. 6 is a sectional view of yet another armor panel system integrated with a fan blade containment case of a gas turbine engine.

With reference to FIG. 6, another structural armor system 28' includes a generally annular armor panel 34A within a fan blade containment assembly 100 of a gas turbine engine 102. Although depicted as a two-spool, turbofan gas turbine engine in the disclosed non-limiting embodiment, it should be understood that the concepts described herein are not limited to use with two-spool turbofan as the teachings can be applied to other gas turbine engine architectures or types such as low bypass gas turbine engines in which engine case structures essentially define an exoskeleton structure to support the core engine therein such that engine case structures or portions thereof are integrally armored.

Figure 7:
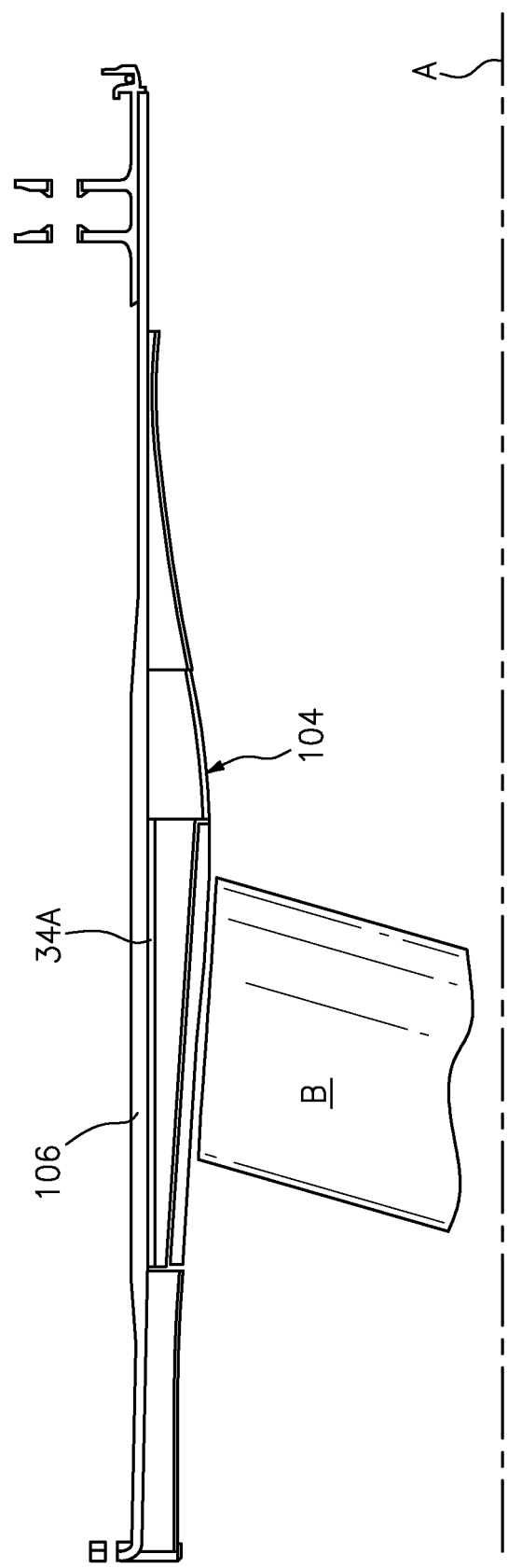
FIG. 7 is an enlarged cross-sectional view of a case section of the gas turbine engine which provides blade containment according to one non-limiting embodiment.

The fan blade containment assembly 100 generally includes an inner structure 104, the generally annular armor panel 34A, and an outer case 106 defined about an engine axis A (FIG. 7). The inner structure 104 may include an abradable layer and honeycomb structures to provides close tolerances to be maintained between a fan blade B and the inner structure 104. The honeycomb structure 72 provides acoustic dampening as well as the potential for retention of smaller blade fragments. The generally annular armor panel 34A resists and dulls the ballistic threat which may be particularly acute when metallic fan blades are utilized.

With the integration of armor into the vehicle structure itself, the ballistic protection of the occupants and crew is provided while the total weight of the armor-structure system may be reduced as compared to parasitic armor systems. That is, the armor panel 34 provides a reinforced composite architecture that tightly couples ballistic and structural face sheets with ballistic fibers and resins as the core stabilizing material. It should be appreciated that although the armor panel 34 may be heavier than an un-armored structural honeycomb panel—typically twice to ten times as heavy—the armor panel 34 disclosed herein is still typically lighter than parasitic armor systems which are applied over un-armored structures.

It should also be appreciated that the armor system of the instant invention may be utilized in fixed wing aircraft, ground transportation vehicles, personal body armor, etc. and that various panel sizes, layer combinations and depth of layers may be utilized and specifically tailored to the desired element which is to be armor protected.

It should be appreciated that relative positional terms such as "forward," "aft," "upper," "lower," "above," "below," and the like are with reference to the normal operational attitude of the vehicle and should not be considered otherwise limiting.

It should be appreciated that like reference numerals identify corresponding or similar elements throughout the several drawings. It should also be appreciated that although a particular component arrangement is disclosed in the illustrated embodiment, other arrangements will benefit herefrom.

Although particular step sequences are shown, described, and claimed, it should be appreciated that steps may be performed in any order, separated or combined unless otherwise indicated and will still benefit from the present disclosure.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be appreciated that within the scope of the appended claims, the disclosure may be practiced other than as specifically described. For that reason the appended claims should be studied to determine true scope and content.

What is claimed is:

1. An armor panel comprising:
a pressure-consolidated, high molecular weight polyethylene fiber composite material layer;
a first skin on a first side of said high molecular weight polyethylene fiber composite material layer;
a second skin on a second side of said high molecular weight polyethylene fiber composite material layer; and
a multiple of pins which penetrate said first skin, said high molecular weight polyethylene fiber composite material layer and said second skin, said polyethylene fiber composite material layer stabilizing said multiple of pins from buckling, wherein said multiple of pins form a truss structure with said first skin and said second skin.

2. The armor panel as recited in claim 1, wherein said first skin is a structural material.

3. The armor panel as recited in claim 2, wherein said structural material is S2 glass composite fibers in API SC-15 toughened epoxy resin.

4. The armor panel as recited in claim 2, wherein said structural material is a metal alloy.

5. The armor panel as recited in claim 4, wherein said metal alloy is titanium.

6. The armor panel as recited in claim 4, wherein said metal alloy is aluminum.

7. An aircraft comprising:
an airframe; and
a structural panel mounted to said airframe, said structural panel includes a pressure-consolidated, high molecular weight polyethylene fiber composite material layer, a first skin on a first side of said high molecular weight polyethylene fiber composite material layer, a second skin on a second side of said high molecular weight polyethylene fiber composite material layer, and a multiple of pins which penetrate said first skin, said high molecular weight polyethylene fiber composite material layer and said second skin, said polyethylene fiber composite material layer stabilizing said multiple of pins from buckling, wherein said multiple of pins form a truss structure with said first skin and said second skin.

8. The aircraft as recited in claim 7, wherein said first skin is a structural material.

9. The aircraft as recited in claim 7, wherein said first skin is S2 glass composite fibers in API SC-15 toughened epoxy resin.

10. The aircraft as recited in claim 7, wherein said first skin is a metal alloy.

11. The aircraft as recited in claim 7, wherein said airframe includes a multitude of frame members and a multitude of beam members.

12. A method of armoring an aircraft comprising:
mounting a structural panel to an airframe, the structural panel includes a pressure-consolidated, high molecular weight polyethylene fiber composite material layer, a first skin on a first side of said high molecular weight polyethylene fiber composite material layer, a second skin on a second side of said high molecular weight polyethylene fiber composite material layer, and a multiple of pins which penetrate said first skin, said high molecular weight polyethylene fiber composite material layer and said second skin, said polyethylene fiber composite material layer stabilizing said multiple of pins from buckling, wherein said multiple of pins form a truss structure with said first skin and said second skin.

13. The method as recited in claim 12, further comprising mounting the structural panel as a floor.

14. The method as recited in claim 12, further comprising mounting the structural panel as a skin.

15. The method as recited in claim 12, further comprising mounting the structural panel within a fan blade containment assembly.

16. The armor panel as recited in claim 1, wherein said pressure-consolidated, high molecular weight polyethylene fiber composite material layer includes a pressure-consolidated matrix material.

17. The armor panel as recited in claim 1, wherein said pressure-consolidated, high molecular weight polyethylene fiber composite material layer is one of a plurality of pressure-consolidated, high molecular weight polyethylene fiber composite material layers arranged in an alternating layer arrangement with non-ballistic layers.

18. The armor panel as recited in claim 17, wherein said non-ballistic layers are foam.

19. The armor panel as recited in claim 1, wherein said first skin and said second skin extend laterally beyond said pressure-consolidated, high molecular weight polyethylene fiber composite material layer, said first skin and said second skin meeting and joining at an edge flange.

20. The armor panel as recited in claim 1, wherein said pressure-consolidated, high molecular weight polyethylene fiber composite material layer is a layer of a carrier including additional layers, said carrier, said first skin and said second skin fully encasing said multiple of pins.

* * * * *